(12) United States Patent
Nishiyama

(10) Patent No.: US 8,321,165 B2
(45) Date of Patent: Nov. 27, 2012

(54) INFORMATION PROCESSING APPARATUS, VOLTAGE ACCEPTANCE TEST SYSTEM, AND VOLTAGE ACCEPTANCE TEST METHOD

(75) Inventor: Kimihiro Nishiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 339 days.

(21) Appl. No.: 12/555,852

(22) Filed: Sep. 9, 2009

(65) Prior Publication Data

US 2010/0063759 A1  Mar. 11, 2010

(30) Foreign Application Priority Data

Sep. 10, 2008  (JP) ................................. 2008-231801

(51) Int. Cl.
*G01R 19/00* (2006.01)
*G06F 11/30* (2006.01)
(52) U.S. Cl. ............. 702/64; 702/65; 702/182; 702/183
(58) Field of Classification Search .............. 702/64–82, 702/182–193, 121–123
See application file for complete search history.

(56) References Cited

U.S. PATENT DOCUMENTS 7,142,996 B2 * 11/2006 Patel et al. ...................... 702/64

FOREIGN PATENT DOCUMENTS

| JP | H05-307492 | | 11/1993 |
| JP | 2004-184111 | * | 7/2004 |

* cited by examiner

*Primary Examiner* — Phuong Huynh
(74) *Attorney, Agent, or Firm* — Fujitsu Patent Center

(57) ABSTRACT

An information processing apparatus including: a test program 2 that acquires a first voltage value which is a voltage value at which a target apparatus operates, allows the target apparatus to operate at the first voltage value, and determines an operating state of the target apparatus; a voltage change controller 12 that changes, in the case where a result of the determination is abnormal state, a voltage value difference which is a difference between a voltage value at the next stage and the first voltage value or a time difference so as to reduce the change rate obtained by dividing the voltage value difference by the time difference and outputs, when a time obtained by adding the time difference to the current time has come, a second voltage value obtained by adding or subtracting to/from the first voltage value to the test program 2 as the first voltage value.

17 Claims, 16 Drawing Sheets

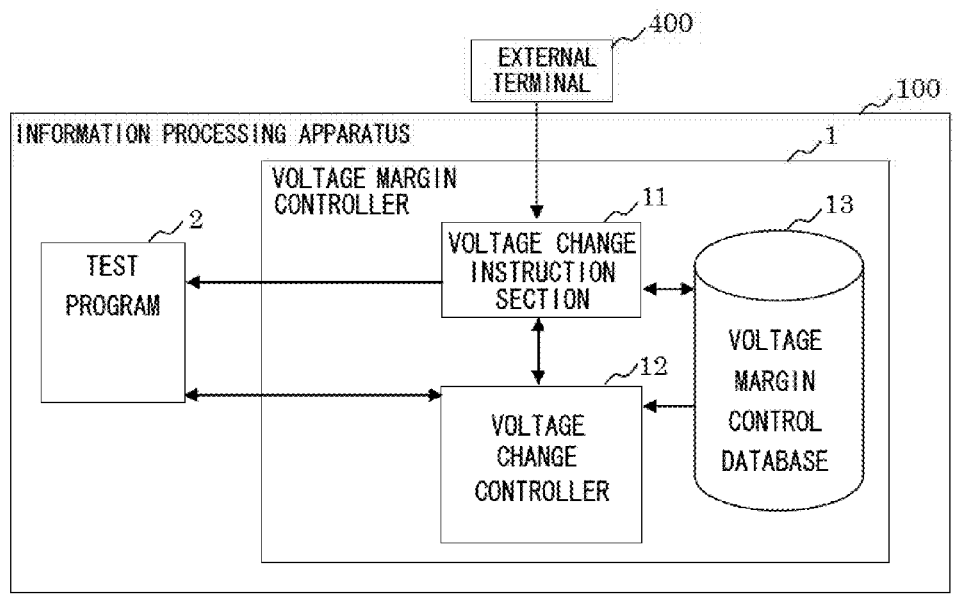
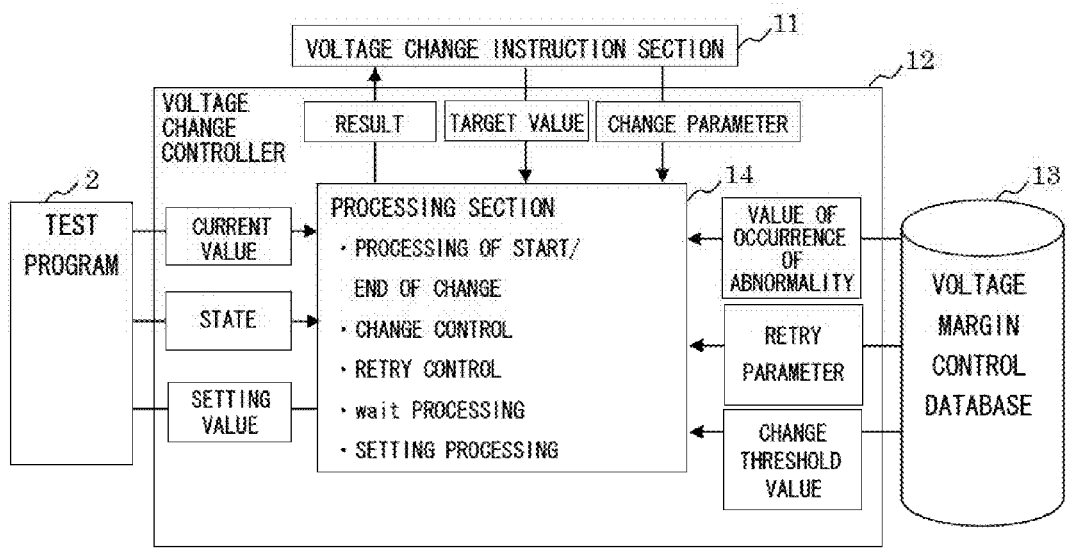

| TARGET VALUE | 15 | 15 | 15 | 15 | 15 | 15 | 15 | 15 | 15 | 15 |
|---|---|---|---|---|---|---|---|---|---|---|
| CURRENT VALUE | 0 | 4 | 8 | 10 | 11 | 12 | 11 | 12 | 13 | 14 | 15 |
| STATE | ○ | ○ | △ | △ | △ | × | ○ | ○ | ○ | ○ | ○ |
| STEP VALUE | 4 | 4 | 2 | 1 | 1 | 1 | 1 | 1 | 1 | 1 | 1 |
| SETTING VALUE | 4 | 8 | 10 | 11 | 12 | 11 | 12 | 13 | 14 | 15 | 16 |
| wait VALUE | 1 | 1 | 1 | 2 | 4 | 4 | 4 | 4 | 4 | 4 |
| VALUE OF OCCURRENCE OF ABNORMALITY | – | – | – | – | – | 12 | 12 | – | – | – | – |
| RETRY PARAMETER | 0 | 0 | 0 | 0 | 1 | 1 | 0 | 0 | 0 | 0 |
| RETRY THRESHOLD VALUE | 3 | 3 | 3 | 3 | 3 | 3 | 3 | 3 | 3 | 3 |
| NUMBER OF TIMES OF CHANGE | 0 | 1 | 2 | 3 | 4 | 5 | 6 | 7 | 8 | 9 | 10 |
| CHANGE THRESHOLD VALUE | 30 | 30 | 30 | 30 | 30 | 30 | 30 | 30 | 30 | 30 |

○ INDICATES "NORMAL", △ INDICATES "WARNING", AND × INDICATES "ABNORMAL"

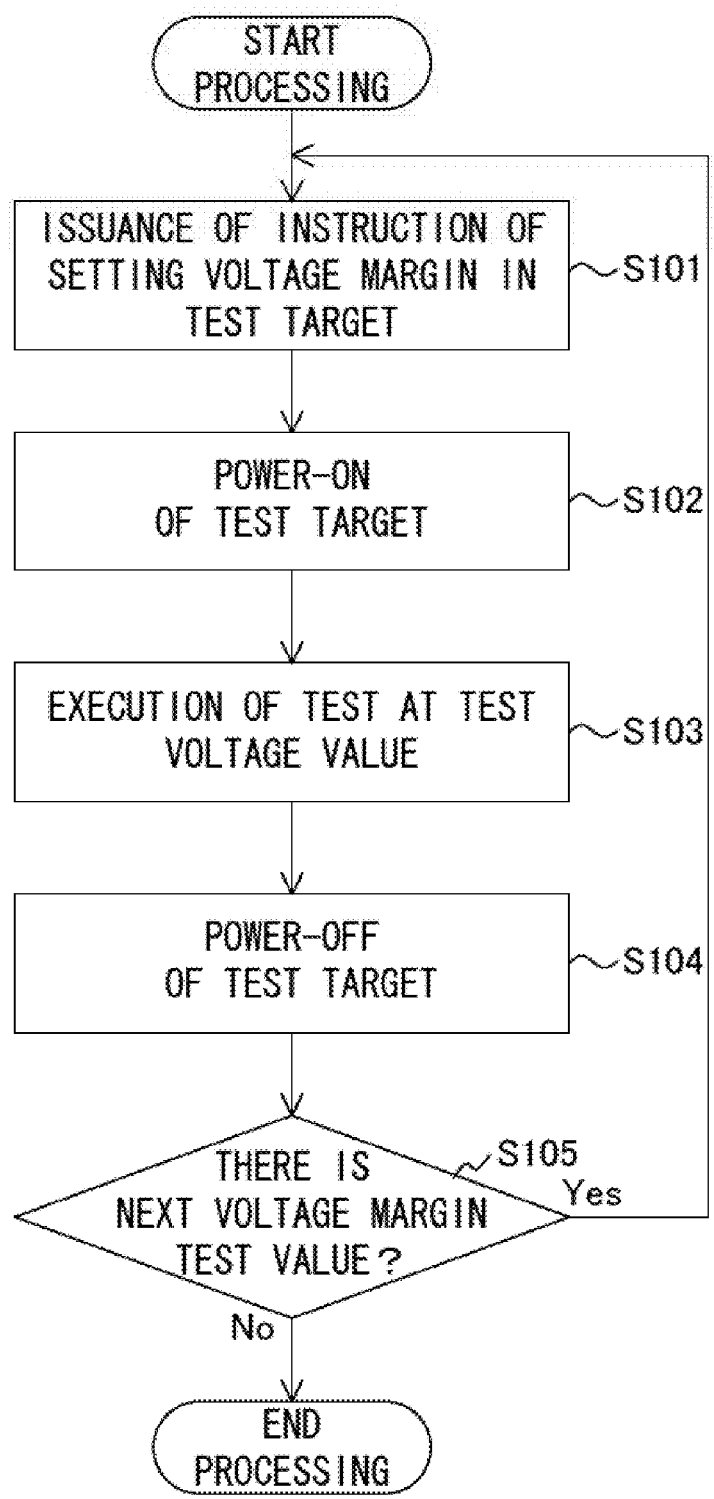

1

INFORMATION PROCESSING APPARATUS, VOLTAGE ACCEPTANCE TEST SYSTEM, AND VOLTAGE ACCEPTANCE TEST METHOD

CROSS-REFERENCE TO RELATED APPLICATION

This application is based upon and claims the benefit of priority of the prior Japanese Patent Application No. 2008-231801, filed on Sep. 10, 2008, the entire contents of which are incorporated herein by reference.

FIELD

The embodiments discussed herein art related to an information processing apparatus, a voltage acceptance test system, and a voltage acceptance test method capable of improving the efficiency of a voltage margin test performed by the information processing apparatus.

BACKGROUND

A configuration of a conventional information processing apparatus in which a plurality of components are included in one casing is depicted in FIG. 16. An information processing apparatus 300 includes, inside a casing, hardware components SB (System Board) 303A, SB 303B, SB 303C, and SB 303D (sometimes collectively referred to as "SB 303") each capable of starting-up an OS, a power controller 302 for controlling a power source of the SB 303, and a resident power source 301.

The power controller 302 has a voltage margin control function of changing voltage to be supplied to the SB 303. An operator executing a voltage margin test uses an external terminal 400 connected to the power controller 302 to execute the voltage margin test which is a test of changing voltage to be supplied to the SB 303. The voltage margin denotes an allowable range of a voltage variation with respect to a prescribed voltage value, and voltage margin test is a test of measuring a voltage variation with respect to a prescribed voltage value that a target apparatus allows.

The components in the information processing apparatus 300 will be described.

Each SB in the SB 303 is constituted by a CPU (Central Processing Unit), a memory, an HDD (Hard Disk Drive), a PCI (Peripheral Component Interconnect) card, and the like. Each SB in the SB 303 is a hardware component functioning as one calculator and is capable of starting-up an OS.

The power controller 302 is a mechanism that operates with a power supply from the resident power source 301 and manages a power source of hardware in the information processing apparatus 300. The power controller 302 is constituted by a unique CPU and memory independent of those provided in the SB 303, an external interface, an ROM (Read Only Memory) for storing firmware, and the like. The power controller 302 has a function of controlling connection/disconnection of a power source to/from each SB in the SB 303 individually so as to provide a function such as a serial interface, LAN, or the like. The function of the power controller 302 is achieved by firmware stored in the ROM and hardware resource such as the CPU and memory cooperating each other. Hereinafter, the firmware of the power controller 302 is referred to as "power control firmware" as needed.

The resident power source 301 supplies power to hardware provided in the information processing apparatus 300. The resident power source 301 constantly supplies power to the power controller 302, while it supplies power to the SB 303 under the control of the power controller 302.

The external terminal 400 is a terminal connected to the power controller 302 by a serial interface or LAN interface and receives a power control instruction from an operator. The information processing apparatus 300 receives an instruction such as activation or stop of a power source through a serial connection terminal software operating under the control of the external terminal 400.

A configuration of a hardware component of the SB 303, which is a target of the voltage margin test, concerning a power supply is depicted in FIG. 17. While the SB 303A is taken as an example in FIG. 17, the same configuration may be used for other SBs.

A DDC (DC/DC Converter) for controlling voltage required for the respective components such as the CPU (Central Processing Unit), memory and LSI (Large Scale Integrated circuit) provided in the hardware component exists in the SB 303A. The DDC receives TRIM input as a trim for an output voltage value and thereby can change the output voltage value. The power control firmware controls respective DDC and a DAC (Digital-to-Analog Converter).

A configuration of a conventional power control firmware provided in the power controller 302 is depicted in FIG. 18.

A power control firmware 302 includes a hardware interface section 323 for controlling an interface with hardware in the information processing apparatus 300, a control section 322 for performing control so as to allow respective functions of the hardware interface section 323 to operate in association with each other, and a serial/CLI (Command Line Interface) section 321 for providing the function of the control section 322 to a user.

The hardware interface section 323 has a function of setting a voltage margin value in the hardware. Further, the hardware interface section 323 provides a Write/Read function of a hardware setting value to/from the DDC, which is required for setting/control of the voltage margin value, to other components in the power control firmware.

The control section 322 realizes a series of processing steps for power control by using functional operation processing performed in the hardware interface section 323. When a power-on instruction is issued, the control section 322 performs a series of control processing steps called power-on sequence, including power-on of the each DDC in the SB 303, initialization of each hardware, and activation of the CPU. Further, in the power-on sequence, the control section 322 performs predetermined functional operation processing (Set_Voltage_margin function, in the case of an example of FIG. 18) in the hardware interface section 323 for a DDC to which a voltage margin setting instruction is instructed. In this case, the control section 322 performs voltage margin control at the time of the power-on sequence in time with power-on control for each DDC.

The serial/CLI section 321 provides to an operator the power-on/off function of the control section 322 as a CLI through the serial interface and terminal software in the external terminal 400.

A specification example on the CLI for a specific system board is depicted. First, a specification example of power-on/off for a specific system board is as follows:

Power_On/Power_Off [SB name]

The serial/CLI section 321 provides a voltage margin control function that the control section 322 performs in the power-on sequence to an operator of the voltage margin test as the CLI. A specification example in which voltage margins set in all the DDCs on the SB specified at the power-on time are increased is as follows:

Set_Voltage_margin [SB name]_all+[margin (%)] A specification example in which voltage margins set in all the DDCs on the SB specified at the power-on time are decreased is as follows:

Set_Voltage_margin [SB name]_all−[margin (%)] A specification example in which a voltage margin set in the specified DDC on the SB specified at the power-on time is increased is as follows:

Set_Voltage_margin [SB name]_[DDC name]+[margin (%)] A specification example in which a voltage margin set in the specified DDC on the SB specified at the power-on time is decreased is as follows:

Set_Voltage_margin [SB name]_[DDC name]−[margin (%)]

The serial/CLI section 321 can also receive a waiting instruction. When receiving the stand-by instruction, the serial/CLI section 321 waits with doing nothing for a specified waiting time. A specification example of the waiting instruction is as follows:

wait [waiting time] minute

Processing steps of a conventional voltage margin test will be described with reference to a flowchart of FIG. 19.

An operator uses the CLI of the external terminal 400 to issue a voltage margin setting instruction (S101), and issues an instruction of powering on a target SB at a test voltage value (voltage value obtained by increasing (or decreasing) a prescribed voltage value by a voltage margin (%)) (S102). The operator executes the test according to a test program operating under an OS which operates in the test target (SB) powered on at the test voltage value (S103).

After completion of the test at the test voltage value, the test target (SB) is powered off based on an instruction from the CLI (S104). In the case where there is another test voltage value (Yes in S105), a series of the above processing steps including the voltage margin setting instruction (S101), power-on (S102), execution of test (S103), and power-off (S104) are executed once again.

As described above, at the time of execution of the conventional voltage margin test, the SB which is a test target needs to be powered on/off every time a setting value of the voltage margin test is changed.

As a prior art relating to the present invention, there is known a service processor disclosed in Japanese Laid-Open Patent Publication No. 05-307462. The service processor can reduce the number of times of key input by using a pattern setting method to thereby simplifying input operation and reducing input error, and thereby increasing time efficiency. Further, there is known a voltage control method and a voltage control circuit disclosed in Japanese Laid-Open Patent Publication No. 2004-184111. The voltage control method and voltage control circuit can reduce man-hours required for inspection and eliminate the possibility of supplying an excessive voltage to damage a device.

[Patent Document 1]
Japanese Laid-Open Patent Publication No. 5-307492
[Patent Document 2]
Japanese Laid-Open Patent Publication No. 2004-184111

The following problems exist in the voltage margin test in which an instruction of power-on/off is issued every time the operator changes the margin setting value.

The voltage margin is set at the time of power-on sequence, so that it is preferably to power-on/off operation for each margin setting, thus taking much time in completing the test. Further, when a configuration in which the voltage margin can be changed in a power-on state is adopted in order to cope with the above problem, unexpected hardware malfunction may occur due to a rapid change in the voltage value.

In order to cope with the abovementioned unexpected hardware malfunction, there can be considered a method in which a function capable of quickly setting an intended voltage value in a power-on state while avoiding a rapid change in the voltage value is implemented in the power controller 302 as a function of the firmware can be considered. However, this involves development cost, man-hours, and time. Similarly, when hardware is constructed so as to endure a rapid change in the voltage value during a power-on state, the system becomes expensive.

SUMMARY

The present invention has made to solve the above problems, and an object thereof is to provide an information processing apparatus, a voltage acceptance test system, and a voltage acceptance test method capable of, when the voltage margin is changed while a device as a test target is powered on, preventing malfunction due to a change in the voltage value occurring in the process through which an intended voltage value is obtained and determining only malfunction caused by a voltage setting value after the change of the voltage margin.

According to an aspect of the invention, there is provided an information processing apparatus including: a test executing section that acquires a first voltage value which is a voltage value at which a target apparatus operates, allows the target apparatus to operate at the first voltage value, and determines that the operating state of the target apparatus is in a normal state, a warning state, or an abnormal state; a change rate changing section that changes, in the case where a result of the determination made by the test executing section is the warning state or abnormal state, a voltage value difference which is a difference between a voltage value at which the target apparatus operates in the next stage and the first voltage value or a time difference which is a time period between the current time and a time when the target apparatus is allowed to operate at a voltage value of the next stage so as to reduce the change rate obtained by dividing the voltage value difference by the time difference; and a voltage value setting section that outputs, when a time obtained by adding the time difference to the current time has come, a second voltage value obtained by adding or subtracting to/from the first voltage value to the test executing section as the first voltage value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a view depicting an example of a configuration of an information processing apparatus according to a first embodiment of the present invention;

FIG. 2 is a view depicting an example of a configuration of a voltage change controller according to the first embodiment;

FIG. 19 is a flowchart depicting processing steps of a conventional voltage margin test.

DESCRIPTION OF EMBODIMENTS

[a] First Embodiment

Figure 3:
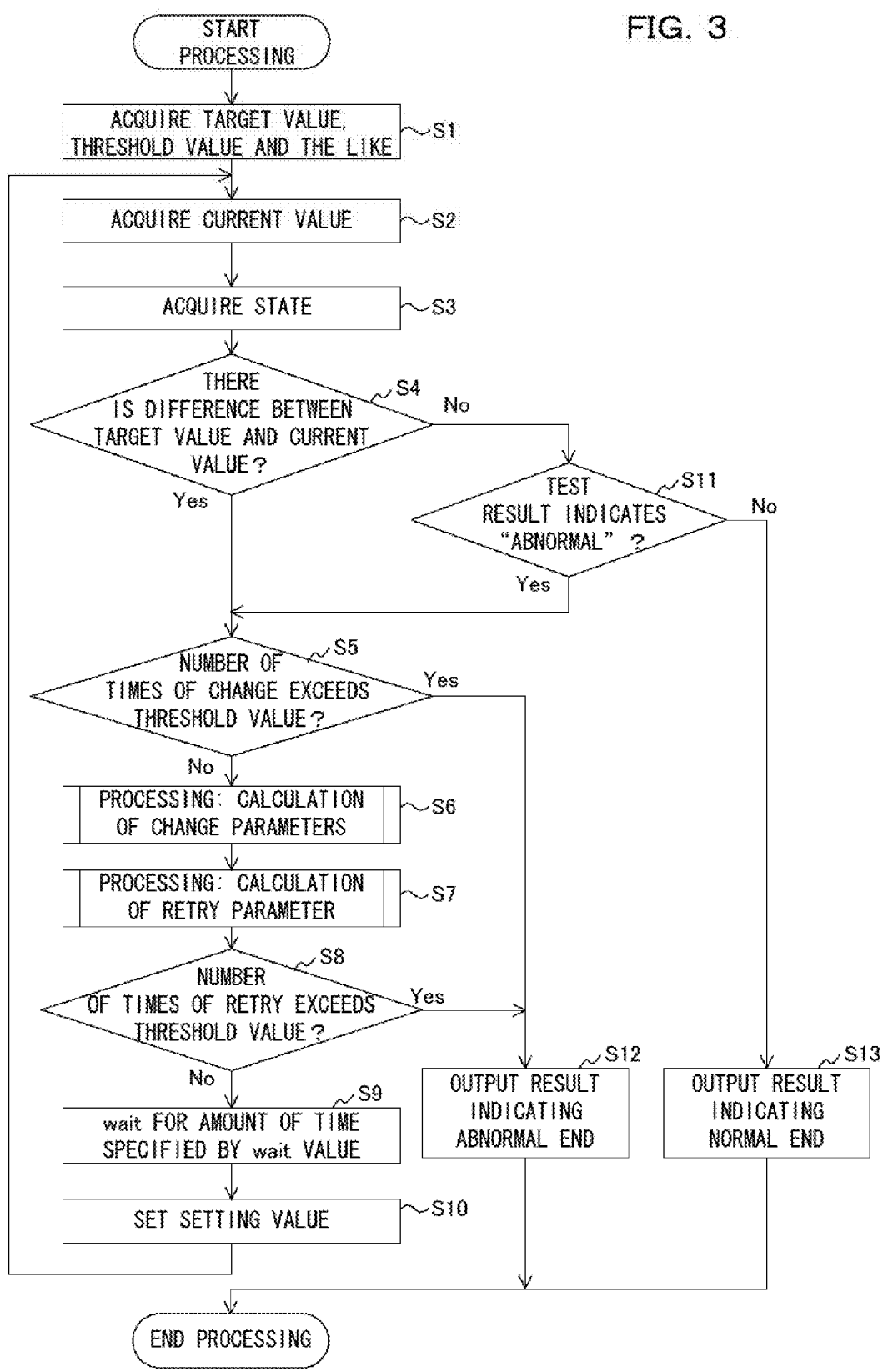
FIG. 3 is a flowchart depicting an example of operation of the information processing apparatus according to the first embodiment.

FIG. 1 depicts an example of a configuration of an information processing apparatus according to a first embodiment of the present invention.

An information processing apparatus 100 includes a voltage margin controller 1 and a test program 2. The voltage margin controller 1 includes a voltage change instruction section 11, a voltage change controller 12, and a voltage margin control database 13. In the first embodiment, a description will be made assuming that a voltage margin test is executed for a predetermined component provided in the information processing apparatus 100. Hereinafter, a component, such as each CPU or memory provided in the abovementioned SB 303, which is subjected to the voltage margin test is referred to as "voltage change target (target device)".

The test program 2, which is included in the test target information processing apparatus 100, is a test program used for voltage margin control. The test program 2 tests, based on an instruction from the voltage change instruction section 11, whether a voltage change target normally operates or not at a predetermined voltage after the voltage change and notifies the voltage change controller 12 of a result of the test. The test result includes three states: "Normal", "Warning" and "Abnormal". The "Normal" indicates a state where the voltage change target normally operates at the set voltage. The "Warning" indicates that although the voltage change target can operate, it includes a correctable error, that is, indicates a state close to abnormal. The "Abnormal" indicates that the voltage change target includes a uncorrectable error and thereby cannot operate any longer, that is, indicates a crucial situation.

The voltage margin control database 13, which is provided in the voltage margin controller 1, stores data used for the voltage margin test. The data stored in the voltage margin control database 13 is used by the voltage change instruction section 11 and voltage change controller 12. The voltage margin control database 13 mainly stores the following data. The detail of each data will be described later.

Test execution order among voltage change targets

Change parameters for each voltage change target

Retry parameter for each voltage change target

The voltage change instruction section 11 receives an instruction from an upper-level program in an external terminal 400 serving as an invoker of voltage margin control and acquires a voltage setting value (upper limit or lower limit voltage setting value that the operator has determined as being tolerable in terms of quality) after the voltage change made for the voltage change target. When there exist a plurality of voltage change targets, the voltage change instruction section 11 selects the voltage change target based on the test execution order among the voltage change targets set in the voltage margin control database 13. The test execution order among the voltage change targets is the order of execution of the test executed for the plurality of voltage change targets. The voltage change instruction section 11 activates/stops the test program 2 with the voltage change target set as a test target. Further, the voltage change instruction section 11 exchanges data with the voltage margin control database 13, specifies the voltage change target and a target value, and activates/stops the voltage change controller 12.

The voltage change controller 12 controls a change in the voltage mainly based on the test result (Normal/Warning/Abnormal) acquired from the test program 2.

The detail of the configuration of the voltage change controller 12 will be described with reference to FIG. 2. The voltage change controller 12 includes a processing section 14 for mainly performing voltage change control and retry control. In the following, a description will be given of the voltage change control and retry control.

The voltage change control will first be described. The processing section 14 changes a variation (difference in voltage value) (hereinafter, referred to as "step" as needed) between a setting value which is a voltage value set for the voltage change target and a current voltage value at which the voltage change target is currently operating and time interval (time difference) (hereinafter, referred to as "wait value" as needed) of the variation to thereby change a voltage variation (hereinafter referred to as "change rate" as needed) per unit time. The change rate is a value obtained by dividing the step value by the wait value and changes depending on the test result acquired from the test program 2. That is, the processing section 14 maintains the current change rate when the test result indicates "Normal" toward a target value, while the processing section 14 sets a smaller (gentler) change rate when the test result indicates "Warning" toward a target value. Further, the processing section 14 sets back the current setting value to the previous setting value and changes the step value and wait value such that the change rate to be obtained becomes smaller, followed by continuation of the voltage change toward a target value.

Next, the retry control will be described. When the test result indicates "Abnormal", processing section 14 retries the test with a step value and wait value by which the change rate becomes smaller. By this retry operation, the processing section 14 can determine whether "Abnormal" state is caused by the voltage setting value itself or rapid change in the voltage value.

Further, the voltage change controller 12 performs start/stop processing of the voltage change operation, processing (wait processing) of waiting for the amount of time specified by the wait value, and processing (setting processing) of issuing an instruction to calculate the voltage setting value and set the calculated setting value in the voltage change target to the test program 2.

The voltage change controller 12 uses the following data mainly.

Target value and data concerning step value and wait value used for change control (hereinafter, step value and wait value are each referred to as "change parameters"), which are acquired through voltage change instruction section 12

Current voltage value (current value) and state (Normal/Warning/Abnormal) of voltage change target, which are acquired from test program 2

Retry parameter indicating number of times of retry performed in voltage margin test and retry threshold value indicating maximum number of times of retry that can be performed, which are acquired from voltage margin control database 13

Value of occurrence of abnormality which is a voltage setting value at which abnormality has previously occurred at the time of execution of the voltage change control and which is acquired from voltage margin control database 13

Change threshold value which is a threshold value of number of times of changes acquired from the voltage margin control database 13

Further, the processing section 14 outputs the setting value calculated in the setting processing to the test program 2.

Next, processing performed by the voltage change controller 12 will be described with reference to a flowchart of FIG. 3.

The voltage change controller 12 acquires initial parameters involved with the voltage change (S1). More specifically, the voltage change controller 12 acquires, from the voltage change instruction section 11, the target value and initial values (initial step value, initial wait value, and minimum step value) of change parameters and acquires, from the voltage margin control database 13, the retry parameter, value of occurrence of abnormality, retry threshold value, and change threshold value.

The voltage change controller 12 then acquires, from the test program 2, the current value set in the voltage change target (S2).

Subsequently, the voltage change controller 12 acquires, from the test program 2, a state of the voltage change target at the current voltage value (S3) and determines whether there is a difference between the target value and current value (S4). In the case where there is a difference between the target value and current value (Yes in S4), the voltage change controller 12 determines whether the number of times of change which is the number of times that the voltage value has changed exceeds a threshold value (change threshold value) (S5).

In the case where the number of times of change does not exceed the change threshold value (No in S5), the voltage change controller 12 calculates the change parameters (S6) and then calculates the retry parameter (S7). The details of the processing of S6 and S7 will be described later.

The voltage change controller 12 then determines whether the retry parameter calculated in S7 exceeds a threshold value (retry threshold value) (S8). In the case where the retry parameter does not exceed the retry threshold value (No in S8), the voltage change controller 12 waits for the amount of time specified by the currently set wait value (S9).

After elapse of the time corresponding to the wait value, the voltage change controller 12 outputs, to the test program 2, the setting value (second voltage value) calculated in S6 as a voltage value (first voltage value) to be set in the voltage change target (S10). After the test program 2 caries out the voltage margin test using the setting value, the voltage change controller 12 executes once again the processing starting from S2 (loop from S10 to S2).

In the case where the number of times of change exceeds the change threshold value (Yes in S5), or where the retry parameter exceeds the retry threshold value (Yes in S8), the voltage change controller 12 outputs a result indicating abnormal end to the voltage change instruction section 11 (S12), whereby the processing flow is ended.

In the case where there is no difference between the target value and current value (No in S4), the voltage change controller 12 determines whether the test result indicates "Abnormal" (S11). In the case where the test result does not indicate "Abnormal" (No in S11), the voltage change controller 12 outputs a result indicating normal end to the voltage change instruction section 11 (S13). In the case where the test result indicates "Abnormal" (Yes in S11), the flow returns to step S5.

Figure 4:
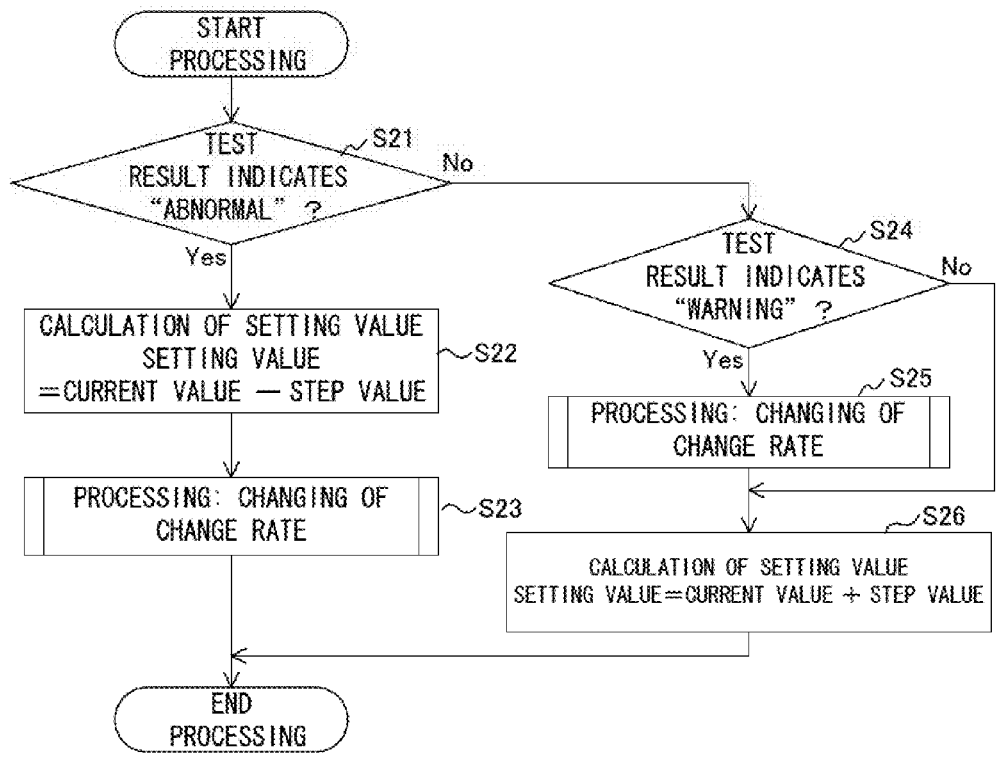
FIG. 4 is a flowchart depicting an example of calculation processing of change parameters according to the first embodiment.

Next, the detail of the calculation processing (S6) of the change parameters will be described with reference to a flowchart of FIG. 4. The voltage change controller 12 performs, as the calculation processing of the change parameters, calculation processing of the setting value and changing processing of step value corresponding to the amount of a change in the voltage and wait value.

The voltage change controller 12 determines whether the test result acquired from the test program 2 is "Abnormal" (S21). In the case where the test result indicates "Abnormal" (Yes in S21), the voltage change controller 12 sets back the setting value to the previous setting value in order to perform retry at a voltage value at which the voltage change target becomes "Abnormal" state or and in order to determine whether "Abnormal" state is caused by the voltage setting value itself after the change or rapid change in the voltage value. Thus, the voltage change controller 12 calculates the setting value once again according to the following equation: setting value=current setting value−step value (S22).

The voltage change controller 12 then changes the step value and wait value so as to obtain a smaller change rate in consideration of a possibility that the abnormal state is caused by a rapid change in the voltage value (S23). The detail of processing of S23 will be described later.

On the other hand, in the case where the test result acquired from the test program 2 does not indicate "Abnormal" (No in S21), the voltage change controller 12 determined whether the test result indicates "Warning" (S24). In the case where the test result indicates "Warning" (Yes in S24), the voltage change controller 12 changes the current change rate into a smaller one in consideration of a possibility that the warning or abnormal state caused by the change may occur if the test is continued at the current change rate (S25). The detail of processing of S25 will be described later.

The voltage change controller 12 then increments the setting value toward the target value by the step value (S26). The setting value is calculated according to the following equation: setting value=current setting value+step value. It is noted that there may be a case where the step value has been changed by the processing of S25.

In the case where the test result does not indicate "Warning" (No in S24), the voltage change controller 12 continues executing the test at the current change rate since the test result indicates a normal state. In this case, the voltage change controller 12 skips S25 and increments the setting value toward the target value by the step value (S26).

Figure 5:
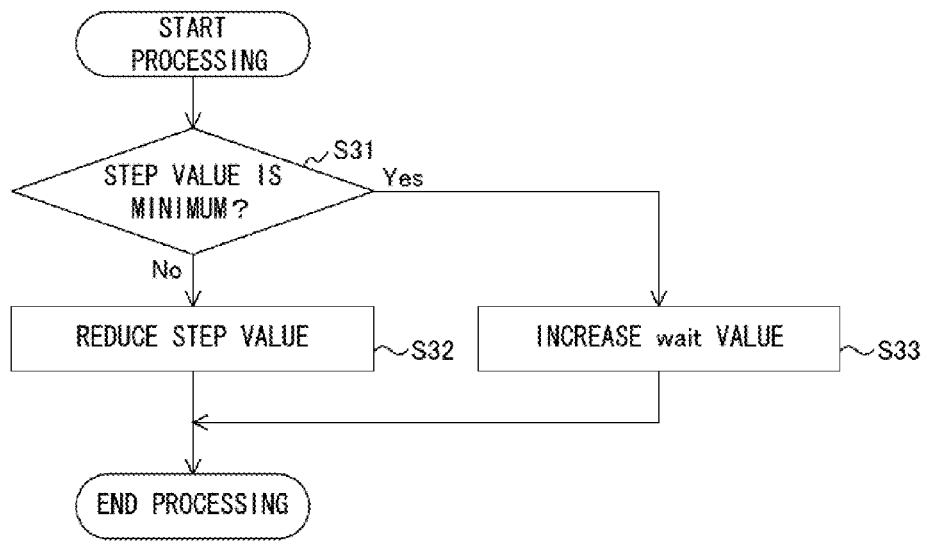
FIG. 5 is a flowchart depicting an example of changing processing of a step value and wait value according to the first embodiment.

The above changing processing of the step value and wait value (change rate changing processing) of S23 and S25 will be described with reference to a flowchart of FIG. 5.

The voltage change controller 12 determines whether a current step value is the minimum value set for the step value which is acquired from the voltage change instruction section 11 (S31). In the case where the current step value is not the minimum value (No in S31), the voltage change controller 12 changes the step value into a smaller one (S32). On the other hand, in the case where the current step value is the minimum value (Yes in S31), the voltage change controller 12 changes the wait value so as to increase the wait time (S33).

As described above, it is possible to make the change rate smaller by reducing the step value toward the minimum value. When the step value reaches the minimum value, the wait value corresponding to the wait time from the current time to next stage is increased to thereby making the change rate further smaller.

Figure 6:
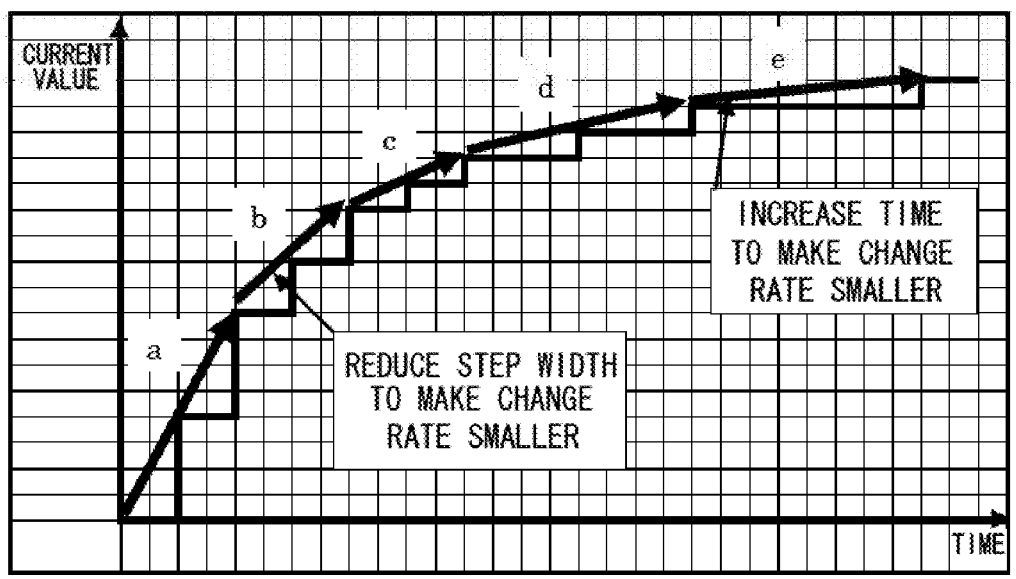
FIG. 6 is a time chart depicting an example of change rate changing processing according to the first embodiment.

FIG. 6 depicts a time chart depicting the change rate changing processing. The horizontal axis represents time, and vertical axis represents the current value. One scale of the vertical axis corresponds to the minimum step value, and gradients a to e denoted by arrows each represent the change rate.

The initial change rate, which is represented by four scales of the step value and two scales of the wait value, depicts a large (steep) gradient (hereinafter, the magnitude of the wait value is represented using the length (short/long) of the wait time). When the voltage change controller 12 executes the processing of S32 in the changing processing depicted in FIG. 5, the change rate is shifted from a to b. That is, the step width is reduced to half the step value corresponding to the initial change rate and, correspondingly, the gradient becomes smaller.

When the voltage change controller 12 executes the processing of S32 in the changing processing depicted in FIG. 5 once again, the step width is reduced to half the step value corresponding to the change rate c and, correspondingly, the gradient (change rate) becomes further smaller. It is assumed, at this time, that the step width becomes a minimum value represented by one scale.

Since it is determined that the step value has reached the minimum value in step S31, the processing of S33 is executed. That is, the voltage change controller 12 increases the wait time in S33 (doubles the wait value in the example of FIG. 6) with the result that the change rate becomes still further smaller. The same can be said for the change from the change rate d to change rate e.

The changing processing of the change rate described above allows removal of an abnormal state caused by a rapid change in the voltage. That is, in the case where the result indicating abnormal end is output, it can be determined that the abnormal state is caused by the voltage value itself after the voltage change.

Figure 7:
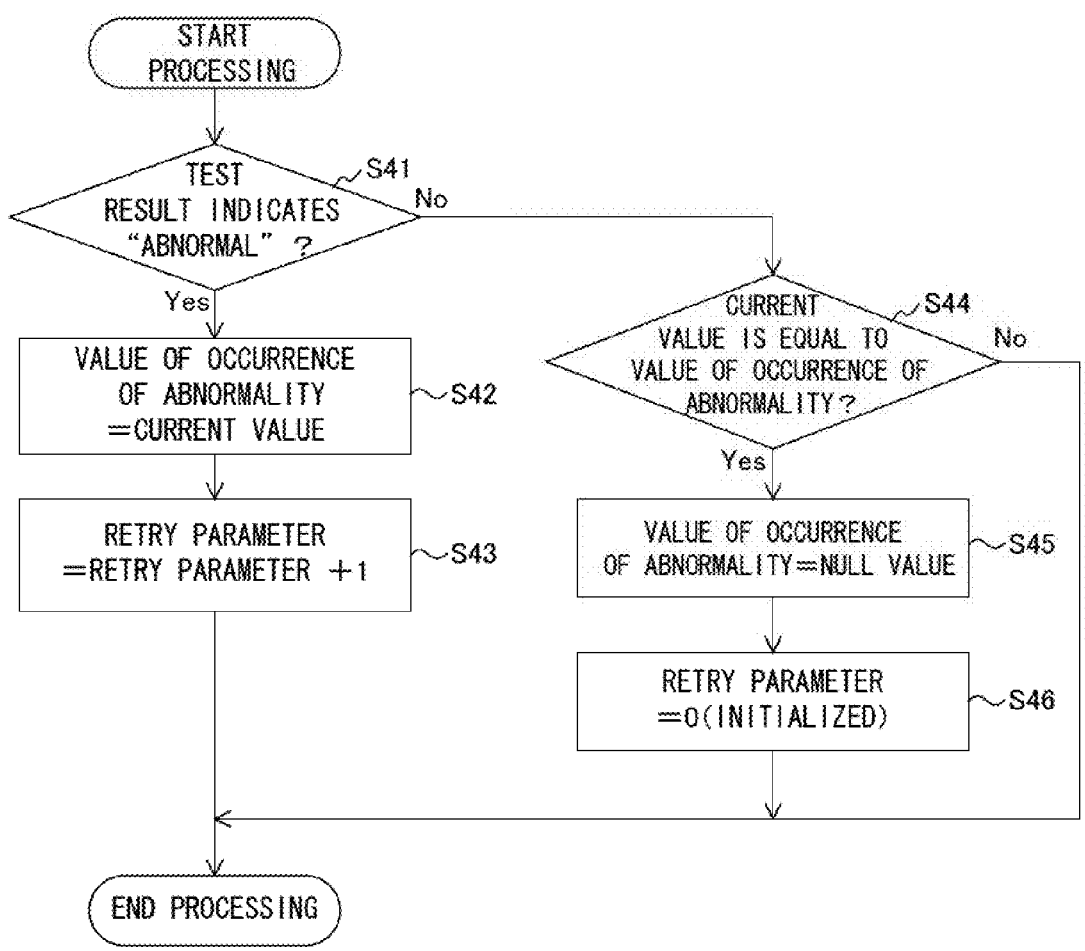
FIG. 7 is a flowchart depicting a detailed example of retry parameter calculation processing according to the present invention.

Next, the detail of the retry parameter calculation processing (S7) will be described with reference to FIG. 7. The retry parameter calculation processing calculates a value of occurrence of abnormality which is a voltage setting value at which abnormality has previously occurred at the time of execution of the voltage change control and a retry parameter indicating the number of times of retry operation which is performed at a smaller change rate in the case where the abnormality has occurred.

The voltage change controller 12 determines whether the test result acquired from the test program 2 indicates "Abnormal" (S41). In the case where the test result indicates "Abnormal" (Yes in S41), the voltage change controller 12 stores the current value in the value of occurrence of abnormality (S42) and adds 1 to a current retry parameter (S43).

On the other hand, in the case where the test result indicates "Warning" or "Normal" (No in S41), the voltage change controller 12 determines whether the current voltage value is equal to the value of occurrence of abnormality (S44). In the case where the current voltage value is equal to the value of occurrence of abnormality (Yes in S44), the voltage change controller 12 sets, e.g., a null value as the value of occurrence of abnormality for invalidation (S45) and initializes the retry parameter to 0 (S46).

In the case where the current voltage value is not equal to the value of occurrence of abnormality (No in S44), the flow shifts to the next step (S8).

Figures 8A, 8B:
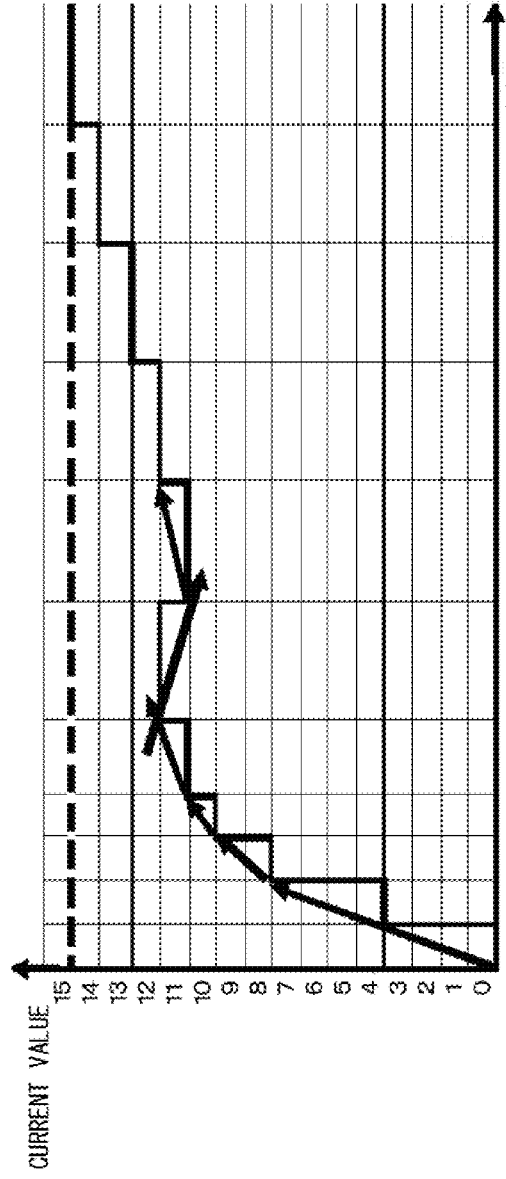
FIGS. 8A and 8B are views depicting examples of time transition and transitions of various values in voltage change control processing according to the first embodiment (normal end case)

Examples of time transition and transition of various data values in the abovementioned voltage change control processing are depicted in FIGS. 8 and 9. FIG. 8 depicts a case where the voltage change test is normally ended. FIG. 8A is a time chart in which the horizontal axis represents time and vertical axis represents current value. FIG. 8B depicts values of various data corresponding to the time axis of FIG. 8A. In FIG. 8B, the target value, current value, setting value, and value of occurrence of abnormality are each represented as a difference obtained assuming that a prescribed voltage value set in the voltage change target is 0.

It is assumed that the voltage change controller 12 has acquired the following values as the parameter initial values. Further, it is assumed that both the retry parameter and the number of time of change also start from 0.

Target value: 15
Initial step value: 4
Minimum step value: 1
Initial wait value: 1
Retry threshold value: 3
Change threshold value: 30

In the following, data transition will be described while referring only to characteristic points.

At the time when the number of times of change is "0" (start of change), there is a difference between the current value "0" and specified target value "15". Since the state is "Normal", "4" is obtained as the next setting value by adding the step value to the current value. After waiting for the amount of time specified by the wait value "1", the voltage change controller 12 outputs the calculated setting value "4" to the test program 2.

At the time when the number of times of change is "2", the state becomes "Warning", so that the voltage change controller 12 reduces the step value to "2" which is half the initial step value and, accordingly, "1" is obtained as the next setting value by adding the step value "2" to the current value. After waiting for the amount of time specified by the wait value "1", the voltage change controller 12 outputs the calculated setting value to the test program 2.

At the time when the number of times of change is "4", the state becomes "Warning" and the step value has reached its minimum value "1". Accordingly, the "12" is obtained as the next setting value by adding the step value "1" to the current value. The wait value becomes "2" which is double the initial wait value. After waiting for the amount of time specified by this wait value "2", the voltage change controller 12 outputs the calculated setting value to the test program 2.

At the time when the number of times of change is "5", the state becomes "Abnormal", so that "11" is obtained as the next setting value by subtracting the step value "1" from the current value. The retry parameter is incremented to "1", and current value "12" is set as the value of occurrence of abnormality. The wait value becomes "4" which is double the previous wait value. After waiting for the amount of time specified by this wait value "4", the voltage change controller 12 outputs the calculated setting value to the test program 2.

At the time when the number of times of change is "6", the state returns to "Normal", so that "12" is obtained as the next setting value by adding the step value "1" to the current value. After waiting for the amount of time specified by the wait value "4", the voltage change controller 12 outputs the calculated setting value to the test program 2.

At the time when the number of times of change is "7", the state is "Normal", so that "13" is obtained as the next setting value by adding the step value "1" to the current value. Since the current value is equal to the value of occurrence of abnormality, the voltage change controller 12 initializes the number of times of retry and invalidates the value of occurrence of abnormality. After waiting for the amount of time specified by the wait value "4", the voltage change controller 12 outputs the calculated setting value to the test program 2.

At the time when the number of times of change is "10", there is no difference between the current value "15" and target value "15". Since the state is "Normal, a result indicating the normal end is output.

Figures 9A, 9B:
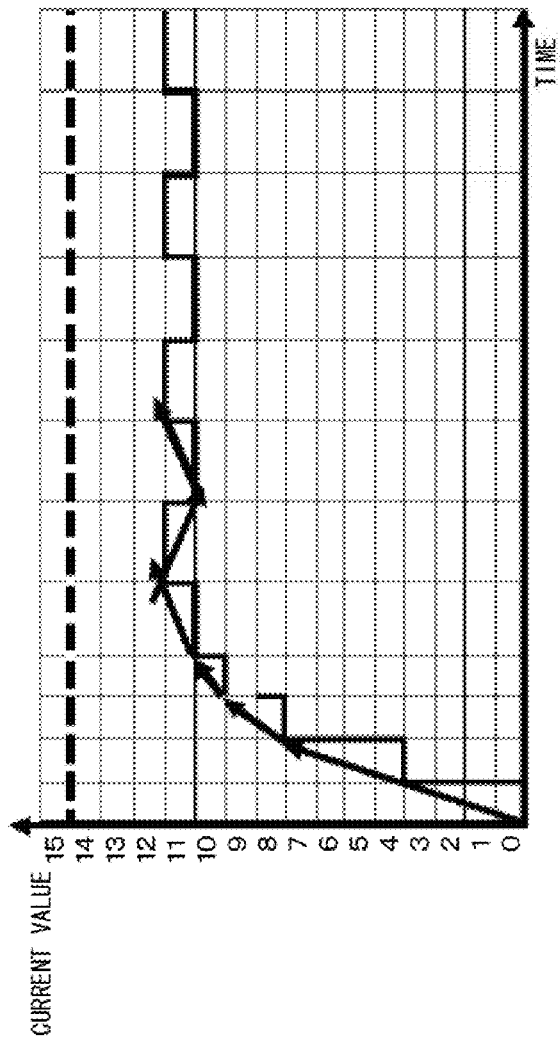
FIGS. 9A and 9B are views depicting examples of time transition and transitions of various values in voltage change control processing according to the first embodiment (abnormal end case)

Next, the case of abnormal end of the voltage change control will be described with reference to FIG. 9. As in the case of FIGS. 8A and 8B, FIG. 9A is a time chart in which the horizontal axis represents time and vertical axis represents current value, and FIG. 9B depicts values of various data corresponding to the time axis of FIG. 9A. Further, in FIG. 9B, the target value, current value, setting value, and value of occurrence of abnormality are each represented as a difference obtained assuming that a prescribed voltage value set in the voltage change target is 0.

A description will made assuming that the initial values of the parameters are set to the same values as those in the case of the normal end. Further, as in the case of the normal end, only characteristic points will be described.

At the time when the number of times of change is "7", the state is "Abnormal", so that "11" is obtained as the next setting value by subtracting the step value "1" from the current value. The voltage change controller 12 increments the retry parameter to "2" by one and sets the value of occurrence of abnormality to "12" which is the current value. Further, the voltage change controller 12 increases the wait value to "8" which is double the previous wait value. After waiting for the amount of time specified by the wait value "8", the voltage change controller 12 outputs the calculated setting value to the test program 2.

At the time when the number of times of change is "11", the state is "Abnormal", so that "11" is obtained as the next setting value by subtracting the step value "1" from the current value. The voltage change controller 12 increments the retry parameter to "4" by one, so that the number of times of retry exceeds the retry threshold value, resulting in abnormal end.

As described above, the voltage change controller 12 can determine the normal/abnormal end of the change to thereby prevent occurrence of malfunction due to a rapid change. Further, the voltage change controller 12 determines whether the abnormality is caused by a change or voltage value itself after the change by performing the retry control.

Figure 10:
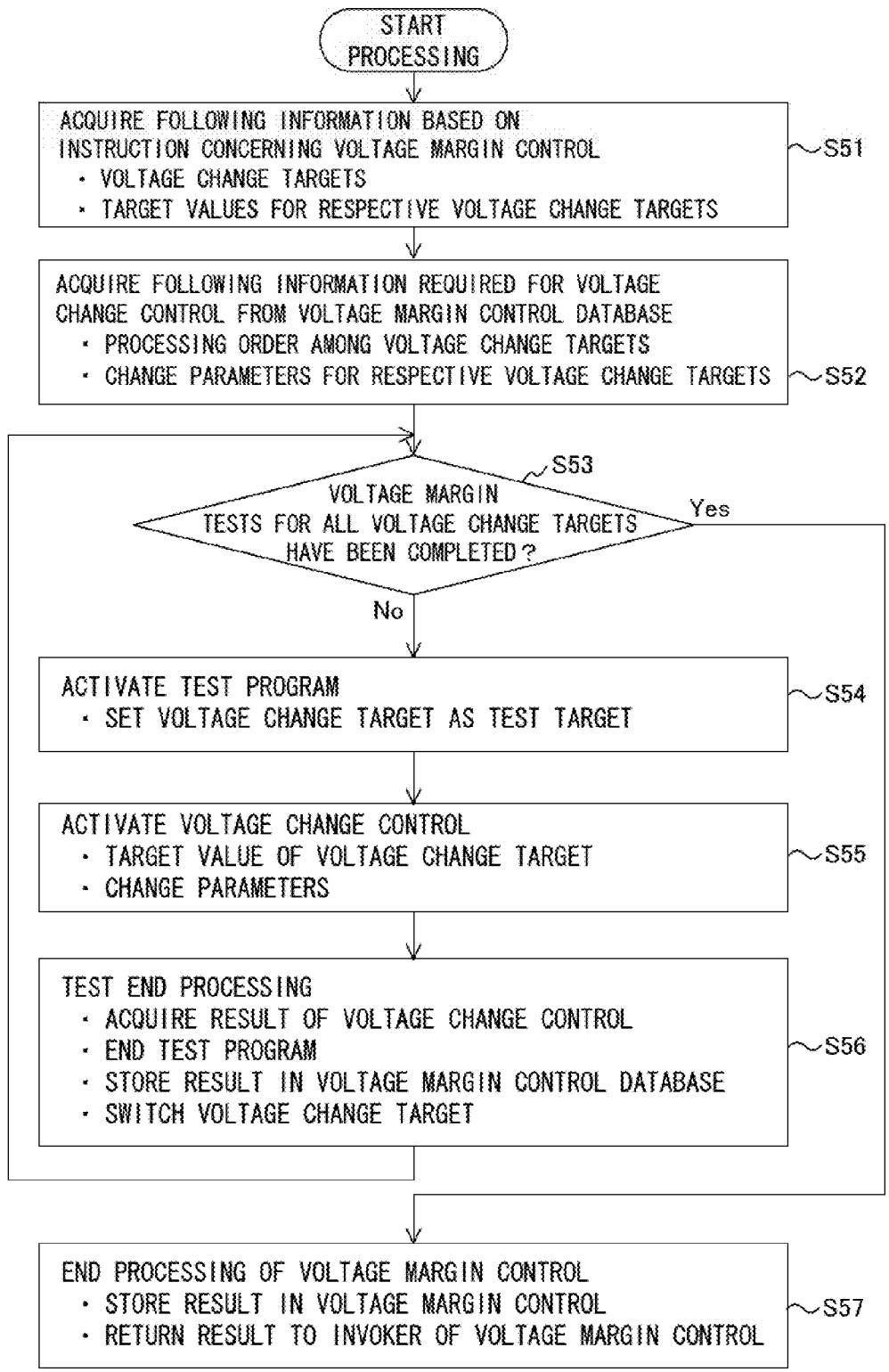
FIG. 10 is a flowchart depicting an example of processing performed by a voltage change instruction section according to the first embodiment.

Next, the processing performed by the voltage change instruction section 11 will be described with reference to a flowchart of FIG. 10.

The voltage change instruction section 11 acquires, from the external terminal 400, specified voltage change targets to be subjected to the voltage margin test and target values for respective voltage change targets (S51). The voltage change instruction section 11 then acquires, from the voltage margin control database 13, the test execution order among the voltage change targets and change parameters for respective voltage change targets (S52).

The voltage change instruction section 11 then determines whether the voltage margin tests for all the voltage change targets have been completed (S53). In the case where there remains any voltage change target that has not been subjected to the voltage margin test (No in S53), the voltage change instruction section 11 specifies a voltage change target to be subjected to the test next based on the acquired test order of the voltage change target and activates the test program 2 so as to execute the test for the specified voltage change target (S54).

The voltage change instruction section 11 then outputs, to the voltage change controller 12, the target value and change parameters of the voltage change target together with a change instruction (S55).

After the execution of the voltage margin test (abovementioned processing performed by the voltage change controller 12), the voltage change instruction section 11 performs test end processing for the voltage change target (S56). More specifically, the voltage change instruction section 11 acquires a result of the test (normal end/abnormal end) from the voltage change controller 12, ends the test program 2, and stores the test result in the voltage margin control database 13. After that, the voltage change instruction section 11 switches the current voltage change target to the next voltage change target that has not yet been subjected to the voltage margin test (S56).

After executing the end processing of S56, the voltage change instruction section 11 returns the processing to S53 and determines whether the voltage margin tests for all the voltage change targets are performed (S53). In the case where there remains any voltage change target that has not been subjected to the voltage margin test (No in S53), the voltage change instruction section 11 executes the test for the voltage change target that has not been subjected to the voltage margin test (S54). In the case where the voltage margin tests for all the voltage change targets have been completed (Yes in S53), the voltage change instruction section 11 stores, in the voltage margin control database 13, a result (e.g., aggregated value such as the number of normal end tests/number of abnormal end tests) of the voltage margin test and returns the test result to the external terminal 400 as the invoker (S57).

Figure 11:
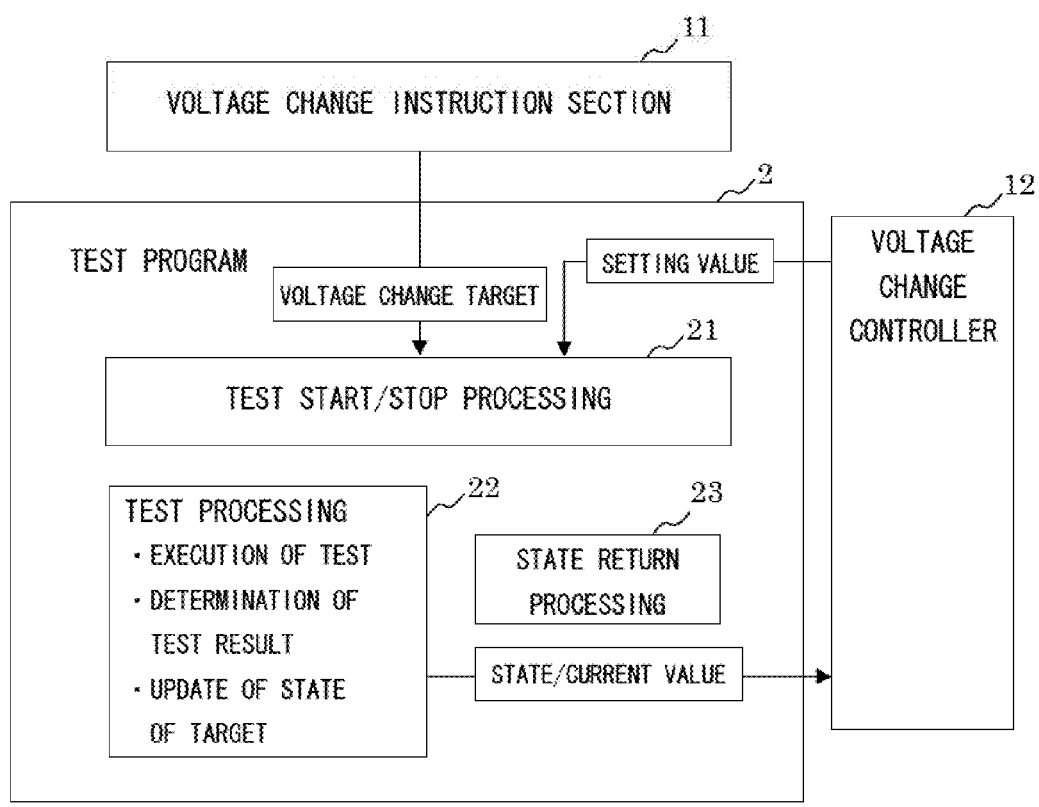
FIG. 11 is a view depicting a configuration of a test program according to the first embodiment.

Next, a configuration of the test program 2 is depicted in FIG. 11. The test program 2 allows a computer to execute-teeststtart/stop processing 21, test processing 22, and state return processing 23.

The test start/stop processing 21 acquires information concerning the voltage change target from the voltage change instruction section 11 and performs start and stop of the test corresponding to the voltage change target. The test processing 22 determines a state (Normal/Warning/Abnormal) at the time when the voltage change target operates at a setting value sequentially transmitted from the voltage change controller 12 during the test. More specifically, the test processing 22 picks up a state for each voltage change target in the hardware component to be subjected to the voltage margin test target and determines Normal/Warning/abnormal. The state return processing 23 responses a state inquiry request from the voltage change controller 12 and returns the state of the voltage change target and current voltage value (current value) to the voltage change controller 12.

The test processing 22 will be described in more detail. Assuming that hardware components of the SB0 (system board of No.0) are set as the voltage margin test targets, the test processing 22 picks up a state for each of the voltage change targets including a CPU (DDC0, etc.), DIMM (Dual-Inline-Memory Module) (DDC1, etc.), and other LSIs (DDC 2, etc.) and determines the state.

Although the test content differs for each voltage change target, the test processing 22 determines, as the test result, a state (Normal/Warning/Abnormal) of the voltage change target. Basically, the test is achieved by writing test data to the voltage change target, reading out data that has been written, and comparing the read out data and expected value data. It is noted that the writing of the test data needs to be performed in consideration of influence on the voltage value test program 2 operating under an OS which operates on the voltage margin test target SB.

Here, as an example, a determination criterion of Warning/Abnormal/Normal used in the case where the voltage change target is the CPU or DIMM will be described.

An ECC (Error Correcting Code) is used in the test for the CPU (DDC 0, etc.) or DIMM (DDC 1, etc.). There is a possibility that the writing of the test data for voltage change to the CPU or DIMM may influence the operations of the OS (Operating System) on the SB and the test program 2 operating under the OS. Thus, the test program 2 determines the state by determining the ECC at the time of reading out of the data.

In the case where no bit error has been detected by the ECC at a predetermined voltage value, the test processing 22 determines "Normal". In the case where one-bit error has been detected by the ECC, the test processing 22 determines "Warning". Here, there is a possibility that the one-bit error has been corrected by the ECC function and thereby the OS and test program 2 operating under the OS normally operate. However, it can be determined that a possibility that abnormality caused by a voltage change or voltage value itself may occur is increased as compared to the normal state.

In the case where plural (two or more)-bit errors have been detected by the ECC, the test processing 22 determines "Abnormal". Although the ECC can detect the plural (two or more)-bit errors, it cannot correct the plural-bit errors. In this case, there may be a case where abnormality occurs in the OS and test program 2 operating under the OS. It is preferably to determine whether this abnormality has been caused by a change or voltage value itself after the change.

Although the test content, test result, and determination criterion of the state differ for each voltage supply destination (other LSIs, etc.) of the voltage change target, the test processing 22 determines: a state where the voltage change target operates without influenced by a voltage change or voltage value itself as "Normal"; a state where the influence comes out or it can be determined that a possibility that the influence appears is increased as "Warning"; and a state where the influence has appeared as "Abnormal".

Figure 12:
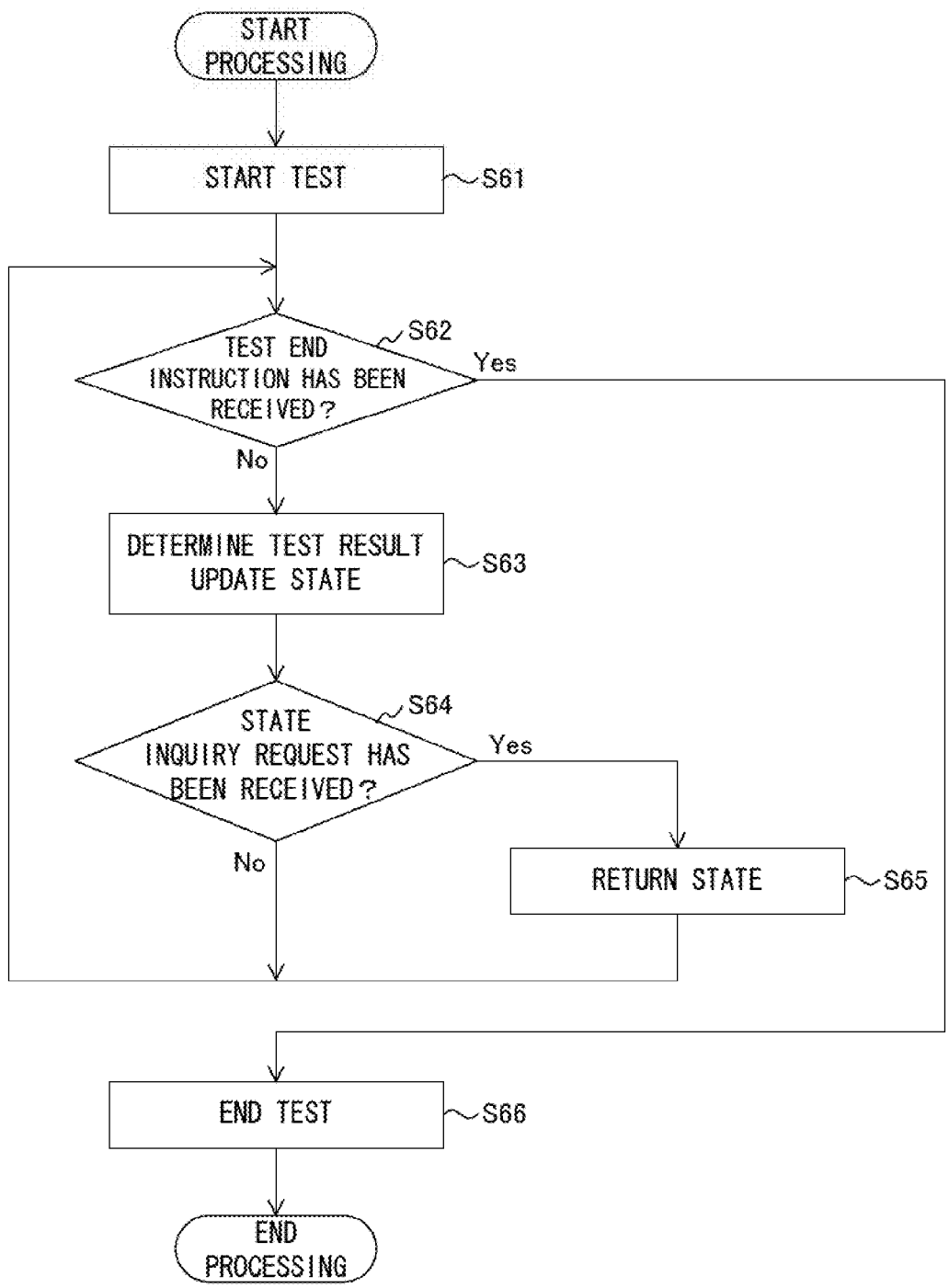
FIG. 12 is a flowchart depicting an example of processing performed by the test program according to the first embodiment.

Next, the processing performed by the test program 2 will be described with reference to a flowchart of FIG. 12.

The test start/stop processing 21 acquires, from the voltage change instruction section 11, a voltage change target together with a test start instruction, acquires, from the voltage change controller 12, a setting value, and starts execution of the test processing for the voltage change target (S61). Then, the test start/stop processing 21 determines whether it has received a test end instruction from the voltage change instruction section 11 (S62). In the case where the test start/stop processing 21 has not received the test end instruction (No in S62), the test processing 22 executes the test for the voltage change target at the voltage corresponding to the setting value and updates a test result, i.e., the state (Normal/Warning/Abnormal) to be determined (S63).

When the state return processing 23 receives a result inquiry request from the voltage change controller 12 (Yes in S64), it returns a test result obtained by the test processing 22 to the voltage change controller 12 (S65), and the flow returns to S62.

On the other hand, there has not issued the result inquiry request (No in S64), the flow returns to S62. In the case where the test end instruction is received or has been received in S62 (Yes in S62), the test program 2 ends the test (S66).

Although whether a voltage can be increased up to the upper limit value of the voltage margin is tested in the first embodiment, the first embodiment can also be applied to a test determining whether a voltage can be reduced to the lower limit value of the voltage margin. In this case, the setting value of S22 is calculated according to the following equation: setting value=current value+step value, and setting value of S26 is calculated according to the following equation: setting value=current value−step value.

[b] Second Embodiment

In the first embodiment, the test program 2 and voltage margin controller 1 are provided in an information processing apparatus, and the voltage margin test is executed for the voltage change target provided in the information processing apparatus. However, it is possible to implement the voltage margin control function in a system outside the information processing apparatus to be tested. In a second embodiment, a voltage margin test system including an information processing apparatus to be tested and an external system for performing voltage margin control will be described.

Figure 13:
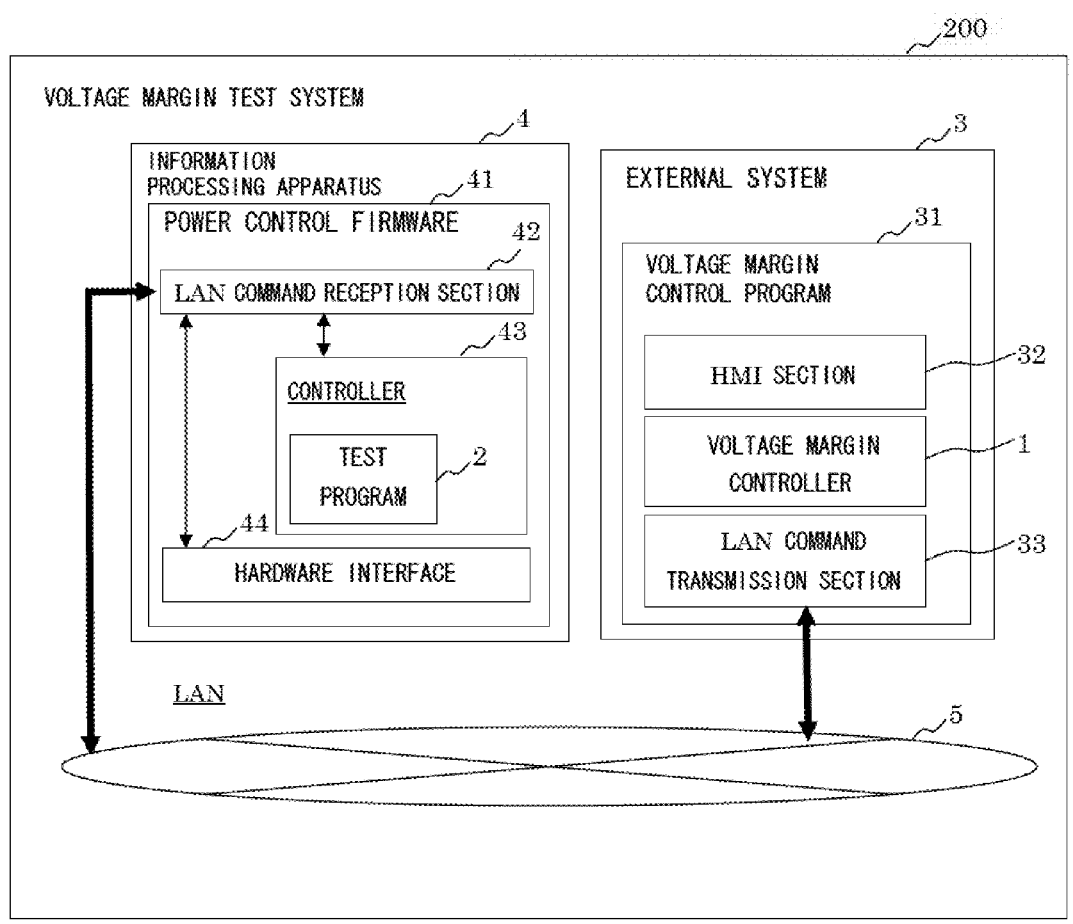
FIG. 13 is a view depicting a configuration of a voltage margin test system according to a second embodiment of the present invention.

A voltage margin test system according to the second embodiment is depicted in FIG. 13. A voltage margin test system 200 (voltage acceptance test system) of the second embodiment is a system in which voltage margin control is achieved in an external system 3 (test apparatus) separated from an information processing apparatus 4 which is a target of the voltage margin test. The components depicted in FIG. 13 denoted by the same reference numerals as those in the first embodiment have the same or similar functions and structures as those in the first embodiment, and the explanation thereof is omitted.

The information processing apparatus 4 to be tested has a power control firmware 41 for a power margin test. The power control firmware 41 includes a LAN command reception section 42 for communicating a voltage control instruction and a test result through a LAN (Local Area network) 5, a hardware interface 44, a controller 43 for executing the test program 2. The functions of the LAN command reception section 42, hardware interface 44, and controller 43 are realized in cooperation with hardware resources such as a CPU, a memory, and a LAN connection device.

Through the LAN 5, the LAN command reception section 42 receives an access authentication or voltage control instruction to be sent to the information processing apparatus 4 and returns a test result to the external system 3.

The hardware interface 44 directly controls hardware provided in the information processing apparatus 4.

The external system 3 has a voltage margin control program 31. The voltage margin control program 31 includes an HMI (Human Interface) section 32 a voltage margin controller 1, and a LAN command transmission section 33. The functions of the HMI section 32, voltage margin controller 1, and LAN command transmission section 33 are realized in cooperation of respective hardware components to be described later.

Through the LAN 5, the LAN command transmission section 33 transmits an access authentication or voltage control instruction to the information processing apparatus 4 and receives a test result from the information processing apparatus 4.

The HMI section 32 receives an instruction input by an operator of the voltage margin test through an input/output device 37 to be described later and outputs a result of the voltage margin test to the input/output device 37.

The voltage margin controller 1 receives a voltage value setting instruction from the HMI section 32, executes the voltage change control described in the first embodiment, and returns a test result to the HMI section 32.

The voltage margin controller 1 covers the functions of the voltage change instruction section 11 and voltage change controller 12 of the first embodiment except for the function thereof of communicating with the test program 2. The communication function is achieved by the LAN command transmission section 33.

Figure 14:
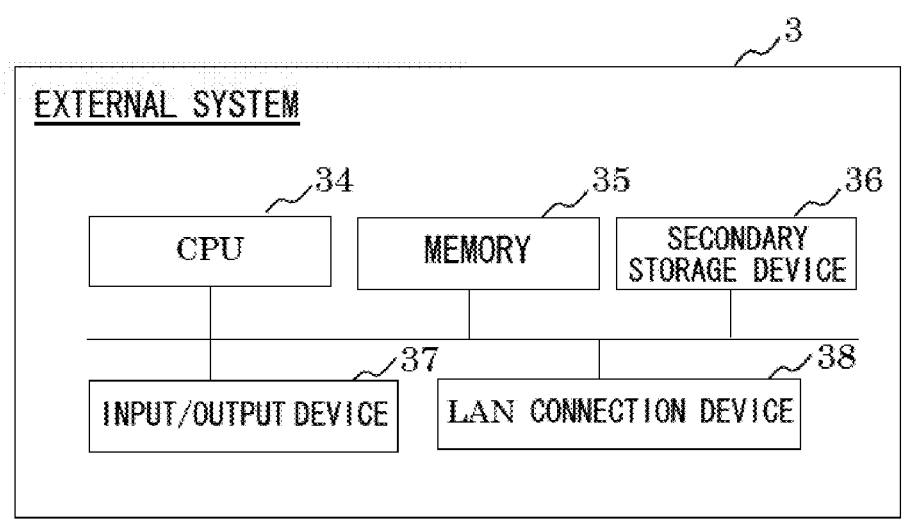
FIG. 14 is a view depicting a hardware configuration of an external system according to the second embodiment.
Figure 16:
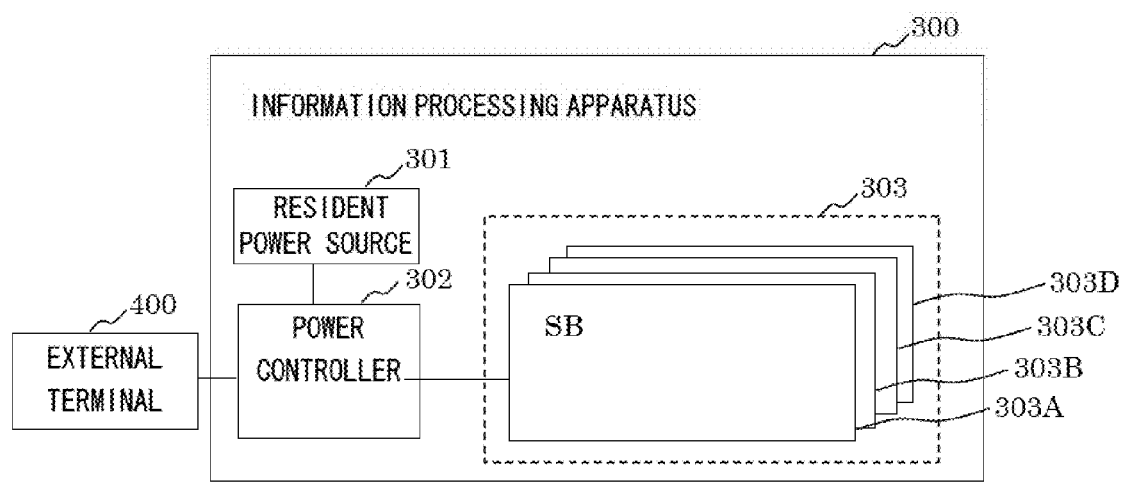
FIG. 16 is a view depicting a configuration of a conventional information processing apparatus in which a plurality of components are included in one casing.
Figure 17:
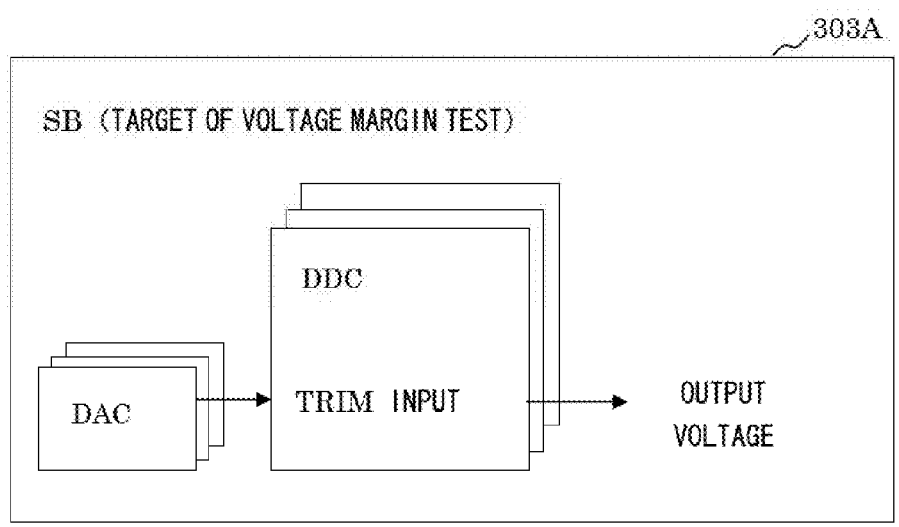
FIG. 17 is a view depicting a configuration of a hardware component of an SB concerning a power supply.
Figure 18:
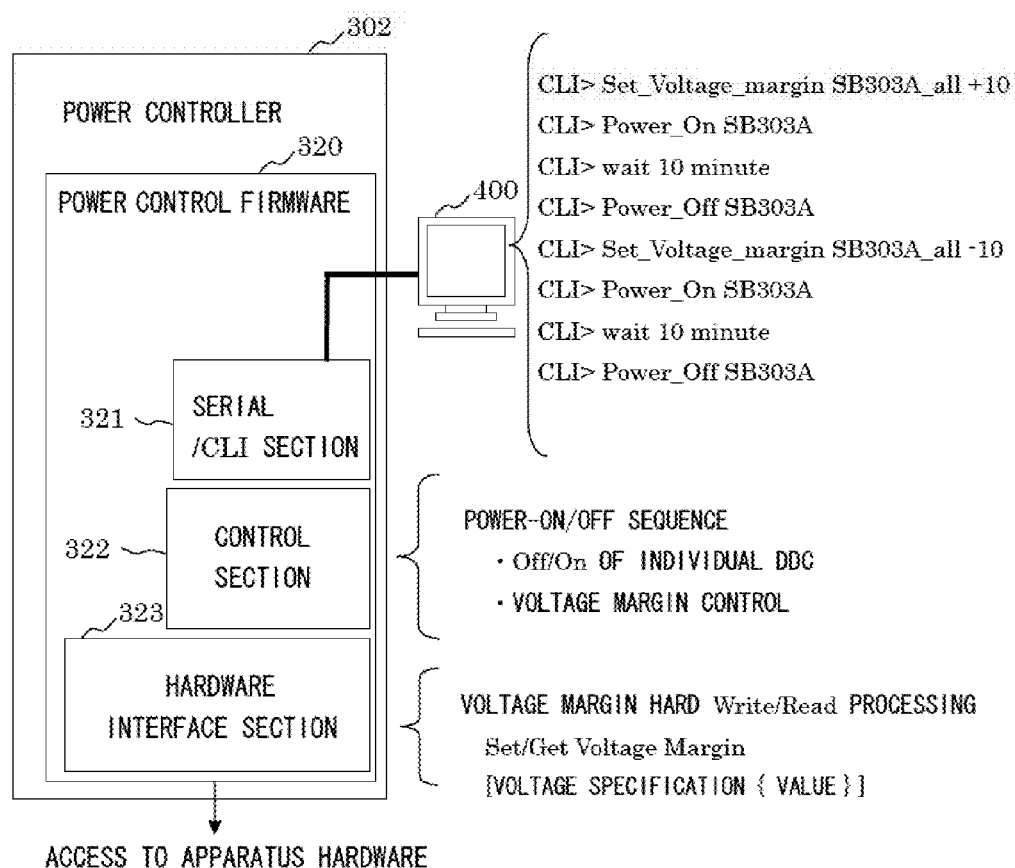
FIG. 18 is a view depicting a configuration of a conventional power control firmware.

A hardware configuration of the external system 3 is depicted in FIG. 14. The external system 3 includes a CPU 34, a memory 35 which is a volatile primary storage device, and a secondary storage device 36, such as a flash memory, a hard disk, or the like, which is a non-volatile storage device. The external system 3 further includes an input/output device 37, such as a monitor, a printer, a keyboard, a mouse, or the like, and a LAN connection device 38 serving as a communication means for performing communication with an external device. Note that the information processing apparatus 4 may have the same hardware configuration as that depicted in FIG. 14 or have a configuration having a plurality of SBs as depicted in FIG. 16.

Figure 15:
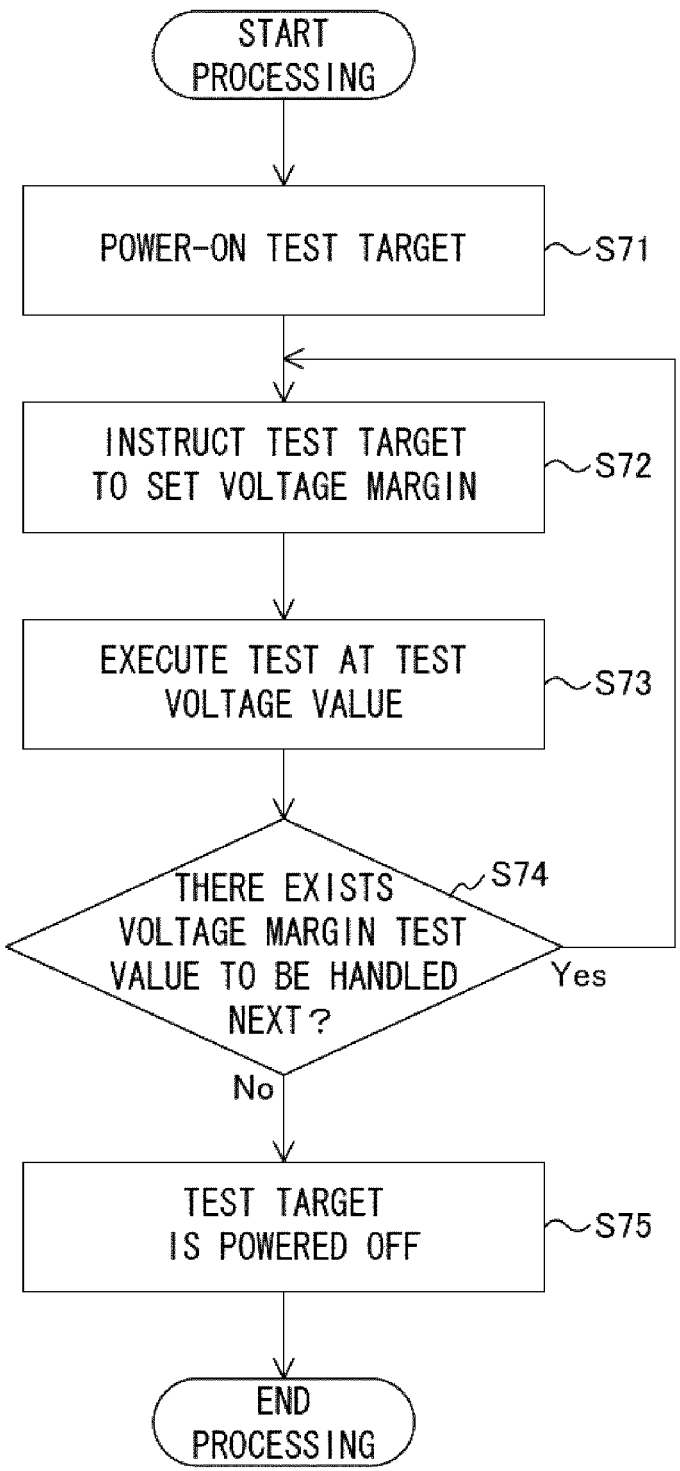
FIG. 15 is a flowchart depicting an example of operation performed by components in the voltage margin test according to the second embodiment.

An example of operation performed by the respective components in the voltage margin test will be described with reference to a flowchart of FIG. 15.

The information processing apparatus 4 to be tested is powered on (S71).

An operator of the voltage margin test uses the HMI section 32 to specify the voltage setting value for the external system 3. Concretely, the HMI section 32 acquires the specification of the voltage setting value and instructs the voltage margin controller 1 to set a voltage margin.

The voltage margin controller 1 receives the instruction from the HMI section 32, issues the voltage margin setting instruction to the test program 2, and starts the voltage margin change control (S72, S73). At the start time of the voltage margin change control, the voltage margin controller 1 issues the following commands to the LAN command transmission section 33.

a. Set_Voltage_Test_On [voltage change target]

The test program 2 acquires, through the LAN command reception section 42, a voltage change target specified by the argument of the command and starts execution of the test for the voltage change target. The test program 2 issues a voltage control instruction to a hardware interface corresponding to the specified voltage change target to thereby execute the test.

The processing of S72 and S73 will be described in more detail. While executing the voltage margin change control, the voltage margin controller 1 issues, to the test program 2, the following commands through the LAN command transmission section 33 and LAN command reception section 42.

Get_Voltage_Margin [Voltage change target]
  Get_Voltage_Test_Result [Voltage change target]
  Set_Voltage_Margin [Voltage change target, setting value]

The Get_Voltage_Margin is a command for acquiring the voltage value of the voltage change target specified by the argument of the command, Get_Voltage_Test_Result is a command for acquiring a test result (Normal/Warning/Abnormal) concerning the voltage change target specified by the argument of the command, and Set_Voltage_Margin is a command for setting the voltage corresponding to the setting value specified by the argument of the command in the voltage change target specified by the argument of the command.

Upon acquiring the above commands, the test program 2 processes the commands while issuing the voltage control instruction to the hardware interface 44 corresponding to the specified voltage change target.

After executing the above processing, the voltage margin controller 1 determines presence/absence of a voltage margin test value to be handled next (S74). In the case where there exists the test value, the flow returns to S72.

In the case where there is no test value to be handled next (No in S74), the test target is powered off, and the flow is ended (S75). At the time when the processing is ended, the voltage margin controller 1 issues, to the test program 2, the following commands through the LAN command transmission section 33 and LAN command reception section 42.

Get_Voltage_Test_Result [Voltage change target]
  Set_voltage_Test_OFF [Voltage change target]

The Get_Voltage_Test_Result is a command for a test result concerning the voltage change target, and Set_voltage_Test_OFF is a command for ending the test.

Advantages of the present embodiment will be described below.

It is possible to change the voltage margin of a target apparatus while the apparatus is powered on, thereby eliminating the need to perform power-on/off operation. Further, the time is taken to complete the test can be reduced.

It is possible to realize a control function capable of changing the voltage margin while the target apparatus is powered on at a lower cost than in the case where the control function is realized as the function of the firmware of the power controller in the apparatus.

It is possible to realize a control function capable of changing the voltage margin while the target apparatus is powered on at a lower cost than in the case where the control function is realized by hardware.

It is possible to increase power-on speed as compared to a case where the voltage margin control is performed in the power-on sequence of the power controller in the target apparatus.

It is possible to realize the voltage margin test without use of a dedicated jig/system and without modification of the target apparatus, thereby achieving automation of the test and minimizing the chance of error.

Further, the control function capable of changing the voltage margin while the target apparatus is powered on consumes a CPU, a memory, and resources in the firmware storage area in the apparatus power controller when the control function is implemented as a function of a power control firmware in the apparatus, although the control function is a function for use at the time of shipping test. According to the present embodiment, the control function capable of changing the voltage margin while the target apparatus is powered on is implemented as a function operating outside the apparatus, so that even if there occurs any fault in the control, it is not necessary to perform correction for the apparatus, thus taking countermeasure against the fault at low cost.

A test executing section is realized by the test program 2 in the present embodiment cooperating with hardware resources such as a CPU and a memory, provided in the information processing apparatus. A change rate changing section and a voltage value setting section corresponding to the voltage change controller 12 in the present embodiment. An instruction section corresponds to the HMI section 32 in the present embodiment.

In the voltage acceptance test, it is possible to change a voltage value while the target apparatus is powered on, and to prevent the target apparatus from being inoperative due to a rapid change in the voltage.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. An information processing apparatus comprising:
a test executing section that, sets a first voltage value which is a value of a voltage to be applied to a target device, performs a test of the target device by causing the target device to operate at a voltage of the first voltage value, and determines whether a state of the target device is in a normal state according to a result of the test; and
a voltage change controller that, when it is determined that the state of the target device is not in the normal state, reduces a rate of a change of the voltage value with respect to time by changing at least one of a voltage value difference of the change and a time difference of the change, the rate being expressed as a value of the voltage value difference divided by the time difference,
wherein when it is determined that the state is in the normal state, the voltage change controller calculates a second voltage value which is closer to a predetermined target value than the first voltage value, by adding the voltage value difference to the first voltage value, waits for a period represented by the time difference, and outputs the second voltage value as the voltage value, and
the test executing section repeats setting the first voltage value, performing the test of the target device, and determining whether the state of the target device is in a normal state.

2. The information processing apparatus according to claim 1, wherein
the test executing section selects the state based on the result of the test, from among the normal state, a warning state, and an abnormal state, and
when the test executing section performs a test of the target device by causing the target device to operate at a voltage of the second voltage value and determines that the state is in the warning state, the voltage change controller outputs the first voltage value as the voltage value, and determines that the state is the warning state according to the result of the test due to the second voltage value, the voltage change controller outputs the first voltage value as the voltage value.

3. The information processing apparatus according to claim 2, wherein
when it is determined that the state is the abnormal state, the voltage change controller adds 1 to the number of occurrences of the abnormal state, and issues an error end notification when the number of occurrences of the abnormal state reaches a predetermined threshold value.

4. The information processing apparatus according to claim 3, wherein
when the voltage value reaches the predetermined target value and it is determined that the state is not the abnormal state, the voltage change controller issues a normal end notification.

5. The information processing apparatus according to claim 4, further comprising a voltage change instructing section that receives a processing start instruction from an external device, transmits the processing start instruction to the test executing section, and acquires the normal end notification or error end notification so as to transmit it to the external device.

6. A voltage acceptance test system comprising:
an information processing apparatus comprising
a test executing section that, sets a first voltage value which is a value of a voltage to be applied to a target device in the information processing apparatus, performs a test of the target device by causing the target device to operate at a voltage of the first voltage value, and determines whether a state of the target device is in a normal state according to a result of the test; and
a test apparatus comprising
a voltage change controller that, when it is determined that the state of the target device is not in the normal state, reduces a rate of a change of the voltage value with respect to time by changing at least one of a voltage value difference of the change and a time difference of the change, the rate being expressed as a value of the voltage value difference divided by the time difference,
wherein when it is determined that the state is in the normal state, the voltage change controller calculates a second voltage value which is closer to a predetermined target value than the first voltage value, by adding the voltage value difference to the first voltage value, waits for a period represented by the time difference, and outputs the second voltage value as the voltage value, and
the test executing section repeats setting the first voltage value, performing the test of the target device, and determining whether the state of the target device is in a normal state.

7. The voltage acceptance test system according to claim 6, wherein
the test executing section selects the state based on the result of the test, from among the normal state, a warning state, and an abnormal state, and
when the test executing section performs a test of the target device by causing the target device to operate at a voltage of the second voltage value and determines that the state is in the warning state, the voltage change controller outputs the first voltage value as the voltage value, and determines that the state is the warning state according to the result of the test due to the second voltage value, the voltage change controller outputs the first voltage value as the voltage value.

8. The voltage acceptance test system according to claim 7, wherein
when it is determined that the state is the abnormal state, the voltage change controller adds 1 to the number of occurrences of the abnormal state, and issues an error end notification when the number of occurrences of the abnormal state reaches a predetermined threshold value.

9. The voltage acceptance test system according to claim 8, wherein
when the voltage value reaches the predetermined target value and it is determined that the state is not the abnormal state, the voltage change issues a normal end notification.

10. The voltage acceptance test system according to claim 9, further comprising an instructing section that receives a processing start instruction from a user, transmits the processing start instruction to the test executing section, and acquires the normal end notification or error end notification so as to transmit it to the user.

11. A voltage acceptance test method comprising:
setting a first voltage value which is a value of a voltage to be applied to a target device;
performing a test of the target device by causing the target device to operate at a voltage of the first voltage value;
determining whether a state of the target device is in a normal state according to a result of the test;
when it is determined that the state of the target device is not in the normal state, reducing a rate of a change of the voltage value with respect to time by changing at least one of a voltage value difference a time difference of the change, the rate being expressed as a value of the voltage value difference divided by the time difference;
when it is determined that the state is in the normal state, calculating a second voltage value which is closer to a predetermined target value than the first voltage value, by adding the voltage value difference to the first voltage value, waiting for a period represented by the time difference, and outputting the second voltage value as the voltage value; and
repeating the setting the first voltage value, performing the test of the target device, and determining whether the state of the target device is in a normal state.

12. The voltage acceptance test method according to claim 11, wherein
the determining selects the state based on the result of the test, from among the normal state, a warning state, and an abnormal state, and the voltage acceptance test method further comprises
when the performing performs the test of the target device by causing the target device to operate at the voltage of the second voltage value and determines that the state is in the warning state, the voltage change controller outputs the first voltage value as the voltage value, and the determining determines that the state is the warning state according to the result of the test due to the second voltage value, outputting outputs the first voltage value as the voltage value.

13. The voltage acceptance test method according to claim 12, wherein
when it is determined that the state is the abnormal state, 1 is added to the number of occurrences of the abnormal state, and an error end notification is issued when the number of occurrences of the abnormal state reaches a predetermined threshold value.

14. The voltage acceptance test method according to claim 13, wherein
when the voltage value reaches the predetermined target value and it is determined that the state is not the abnormal state, a normal end notification is issued.

15. The voltage acceptance test method according to claim 14, wherein
in response to receiving a processing start instruction from an external device, the repeating repeats the setting, the performing, and the determining, and transmits the normal end notification or an error end notification to the external device, according to the determining.

16. The information processing apparatus according to claim 2, wherein
when it is determined that the state is the warning state, the voltage change controller calculates the value by adding the voltage value difference to the acquired voltage value, waits for a period represented by the time difference, and outputs the second voltage value as the voltage value.

17. The information processing apparatus according to claim 2, wherein
when the test execution section detects an uncorrectable error based on the test, the test execution section determines that the state is the abnormal state, and
when the test execution section detects a correctable error based on the test, the test execution section determines that the state is the warning state.

* * * * *